US012798051B2

(12) United States Patent
Zhao

(10) Patent No.: US 12,798,051 B2
(45) Date of Patent: Nov. 17, 2026

(54) ELECTRICIAN PLIERS WITH EXTENDED PLIER SLEEVES

(71) Applicant: Yanming Zhao, Luzhou (CN)

(72) Inventor: Yanming Zhao, Luzhou (CN)

( * ) Notice: Subject to any disclaimer, the term of this patent is extended or adjusted under 35 U.S.C. 154(b) by 194 days.

(21) Appl. No.: 18/605,304

(22) Filed: Mar. 14, 2024

(65) Prior Publication Data

US 2025/0178163 A1 Jun. 5, 2025

(30) Foreign Application Priority Data

Nov. 30, 2023 (CN) ........................ 202323261429.X

(51) Int. Cl.
*B25B 7/22* (2006.01)
*H02G 1/12* (2006.01)

(52) U.S. Cl.
CPC ............. *B25B 7/22* (2013.01); *H02G 1/1224* (2013.01)

(58) Field of Classification Search
CPC ......... B25G 1/1224; B25G 1/1214; B25B 7/22
USPC ...................................................... 7/107, 108
See application file for complete search history.

(56) References Cited

U.S. PATENT DOCUMENTS

| | | | | |
|---|---|---|---|---|
| 3,654,647 | A * | 4/1972 | Neff | H02G 1/1214 D8/58 |
| 6,234,050 | B1 * | 5/2001 | Konen | B25G 1/102 81/417 |
| 6,848,139 | B2 * | 2/2005 | Simon | B25B 7/22 7/127 |
| 12,015,232 | B1 * | 6/2024 | Lin | H01R 43/042 |
| 2004/0205897 | A1 * | 10/2004 | Hartranft | H02G 1/1214 7/107 |
| 2006/0236823 | A1 * | 10/2006 | MacLain | B25B 7/22 81/418 |
| 2025/0226642 | A1 * | 7/2025 | Du | H02G 1/1212 |

* cited by examiner

*Primary Examiner* — Hadi Shakeri

(57) ABSTRACT

The present utility patent provides electrician pliers with extended plier sleeves, which comprise two plier bodies connected by rotation, wherein each of the plier bodies comprises a jaw and a plier handle, the two jaws are provided with through holes with the same height, and a wire winding knife is arranged in one of the through holes to form a wire winding part; a wire splitting knife is arranged on a jaw of the other plier body to form a wire splitting part; and two plier sleeves are respectively sleeved with the two plier handles, and the two plier sleeves extend correspondingly to the wire winding part and the wire splitting part and coat a periphery of the through hole to shield welding lines at the wire winding part and the wire splitting part.

6 Claims, 3 Drawing Sheets

ELECTRICIAN PLIERS WITH EXTENDED PLIER SLEEVES

TECHNICAL FIELD

The present utility patent relates to the technical field of electrician pliers, and in particular, to electrician pliers with extended plier sleeves.

BACKGROUND

Electrician pliers are one of the hand tools commonly used by electricians, and have a structure mainly formed by two plier bodies hinged through a riveting shaft. There are various types of existing electrician pliers, most of which have many functions and can meet different requirements of electricians in the wire handling operation to a certain extent.

Each of the two plier bodies of the existing electrician pliers is provided with a wire winding part and a wire splitting part. When the electrician pliers are manufactured, a via hole is formed in the plier body firstly, and then a wire winding knife and a wire splitting knife are welded in the via hole, so that the wire winding knife and the wire splitting knife are stably mounted on the jaw. However, welding lines are generated on the plier bodies after the wire winding knife and the wire splitting knife are welded, and polished marks also appear on the welding lines after polishing, which causes the problem that the electrician pliers are not aesthetic, and further spends more time processing the marks and increases more manufacturing cost.

In addition, although the existing electrician pliers have many functions, the electrician pliers fail to fully utilize a spatial position of the plier bodies; consequently, various functions cannot be fully added to the electrician pliers, which undoubtedly limits the application range of the electrician pliers.

SUMMARY

A primary objective of the present utility patent is to provide electrician pliers with extended plier sleeves, which aims to solve at least one problem in the background.

To achieve the objective, a technical solution of the present utility patent is as follows.

The present utility patent provides electrician pliers with extended plier sleeves, which comprise:

two plier bodies connected by rotation, wherein each of the plier bodies comprises a jaw and a plier handle, the two jaws are provided with through holes with the same height, and a wire winding knife is arranged in one of the through holes to form a wire winding part; a wire splitting knife is arranged on a jaw of the other plier body to form a wire splitting part; and two plier sleeves are respectively sleeved with the two plier handles, and the two plier sleeves extend correspondingly to the wire winding part and the wire splitting part and coat a periphery of the through hole.

Compared with the prior art, the electrician pliers provided by the present utility patent have the advantages that the plier sleeves extend to the wire winding part and the wire splitting part and coat the periphery of the through hole, and the welding lines at the wire winding part and the wire splitting part are shielded, so that the aesthetics of the electrician pliers is effectively improved, and there is no need to spend more time processing marks after polishing.

In a preferred embodiment, the plier sleeve is provided with a via hole, and the via hole is adapted to and aligned with the through hole in shape and size.

In a preferred embodiment, the through hole is in a shape of a circle and a polygon.

In a preferred embodiment, the via hole is in a shape of a circle and a polygon.

In a preferred embodiment, the plier sleeve is provided with anti-slip lines.

In a preferred embodiment, a rotating core is arranged between the two plier bodies; inner sides that are of the two jaws and that are positioned above the rotating core jointly form a wire clamping part, a wire-sheath rotating part and a wire stripping part; and inner sides that are of the two jaws and that are positioned below the rotating core jointly form a terminal pressing part and a wire-sheath opening part.

In a preferred embodiment, an inner side of one of the two jaws is provided with a first notch, and an inner side of the other jaw is provided with a cutting edge corresponding to the first notch to form the wire-sheath rotating part.

In a preferred embodiment, an inner side of one of the two jaws is provided with a second notch, and an inner side of the other jaw is provided with a sharp knife corresponding to the second notch to form the wire-sheath opening part.

In a preferred embodiment, the terminal pressing part comprises a cold-pressed terminal pressing part and a tubular terminal pressing part.

In a preferred embodiment, an outer side of one of the two jaws is provided with a groove part for screwing hexagonal nuts and hexagonal head screws.

For a better understanding and implementation, the present utility patent is further described in detail below in conjunction with the drawings.

BRIEF DESCRIPTION OF DRAWINGS

The drawings illustrated herein are used to provide a further understanding of the present utility patent and constitute a part of the present application, and the schematic embodiments of the present utility patent and descriptions thereof are used to explain the present utility patent and do not constitute an improper limitation to the present utility patent. In the drawings.

DESCRIPTIONS OF REFERENCE NUMERALS

Figure 1:
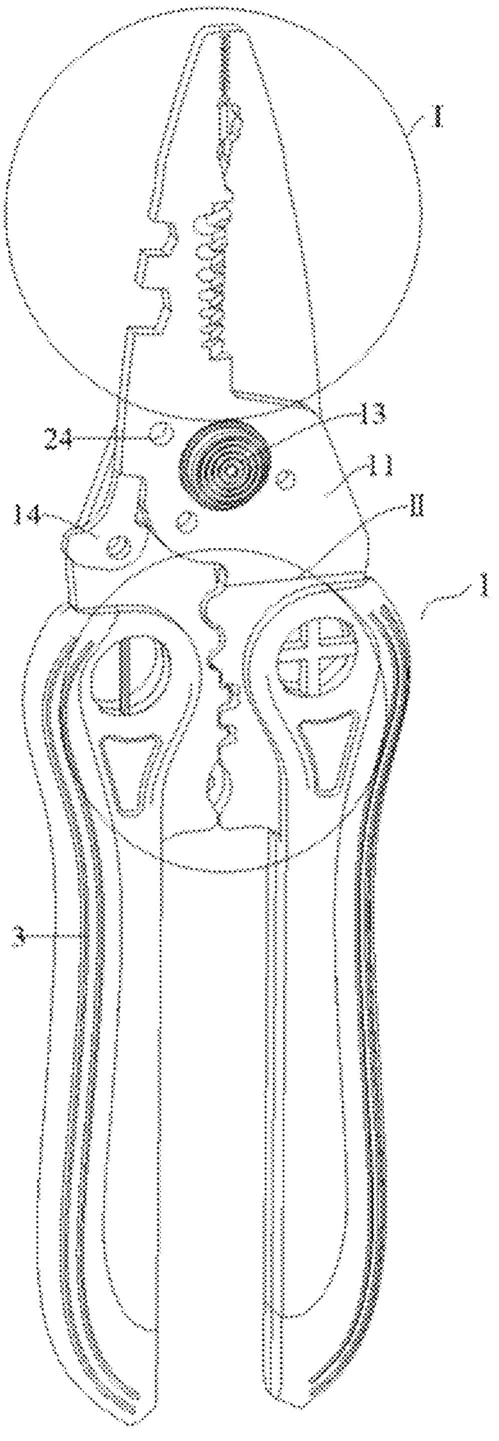
FIG. 1 is a schematic structural view of the electrician pliers with extended plier sleeves.

1: plier body, 11: jaw, 12: plier handle, 13: rotating core, 14: safety lock catch, 21: wire clamping part, 22: wire-sheath rotating part, 221: first notch, 222: cutting edge, 23: wire stripping part, 24: steel wire cutting part, 25: terminal pressing part, 251: cold-pressed terminal pressing part, 252: tubular terminal pressing part, 26: wire-sheath opening part, 261: second notch, 262: sharp knife, 27: groove part, 28: wire winding part, 29: wire splitting part, 3: plier sleeve, 31: via hole, and 32: anti-slip line.

DETAILED DESCRIPTION OF EMBODIMENTS

In order to better illustrate the present utility patent, the present utility patent is described in further detail below with reference to the drawings.

It is clear that the described embodiments are merely some but not all of embodiments of the present application. All other embodiments obtained by those of ordinary skill in the art based on embodiments of the present application without creative efforts shall fall within the protection scope of the present application.

The terminology used herein is for the purpose of describing particular embodiments only and is not intended to be limiting of the embodiments of the present application. The terms “a”, “said” and “the” of singular forms used in embodiments and the appended claims of the present application are also intended to include plural forms, unless otherwise specified in the context clearly. It should also be understood that, the term “and/or” used herein indicates and includes any or all possible combinations of one or more associated listed items.

When accompanying drawings are involved in the description below, the same numbers in different drawings represent the same or similar elements, unless otherwise indicated. The modes of implementation described in the following exemplary embodiments do not represent all modes of implementation consistent with the present application. Rather, they are merely examples of apparatus and methods consistent with certain aspects of the present application detailed in the appended claims. In the description of the present application, it should be understood that the terms “first”, “second”, “third” and the like are intended to distinguish between similar objects but do not necessarily indicate a specific order or sequence, nor can these terms be understood to indicate or imply relative importance. Those of ordinary skill in the art may understand specific meanings of the foregoing terms in the present application according to specific cases.

In the description of the present utility patent, it should be understood that directions or positional relationships indicated by terms “longitudinal”, “lateral”, “front”, “rear”, “left”, “right”, “vertical”, “horizontal”, “top”, “bottom”, “inner”, “outer” and the like are those shown based on the accompanying drawings, and are merely intended to facilitate and simplify description rather than indicate or imply that the indicated apparatus or element must have a specific direction and must be configured and operated according to the specific direction. Therefore, these directions or positional relationships should not be construed as limiting the present utility patent.

Figure 2:
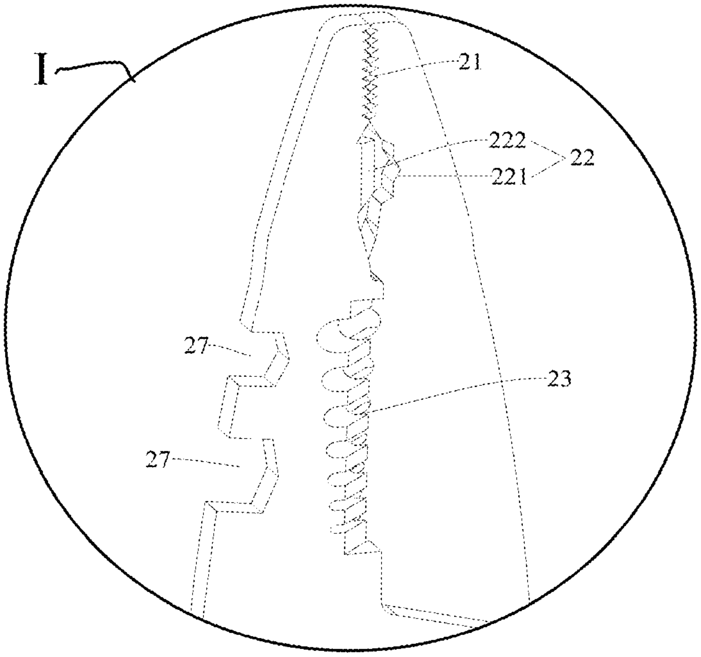
FIG. 2 is an enlarged view of portion I in FIG. 1.
Figure 3:
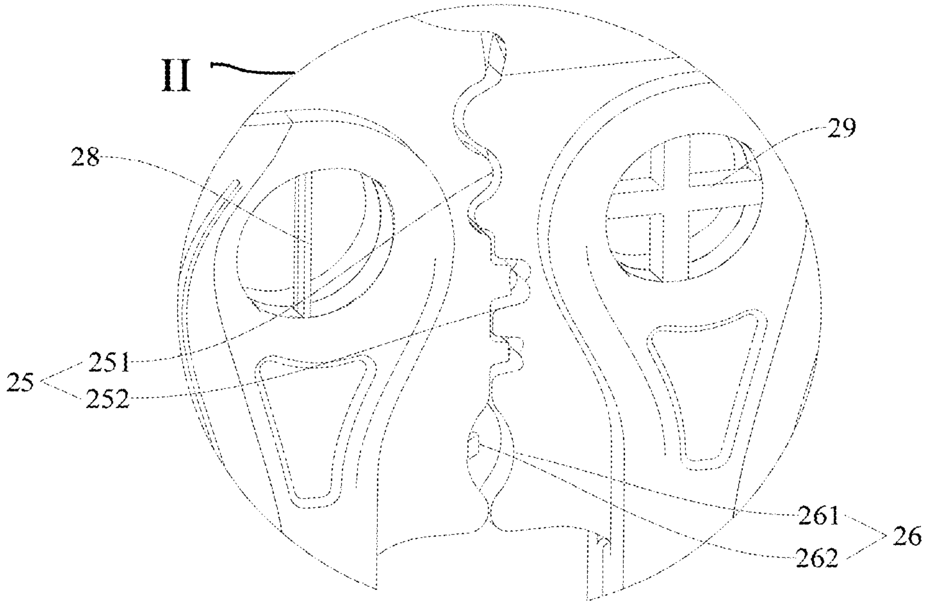
FIG. 3 is an enlarged view of portion II in FIG. 1.
Figure 4:
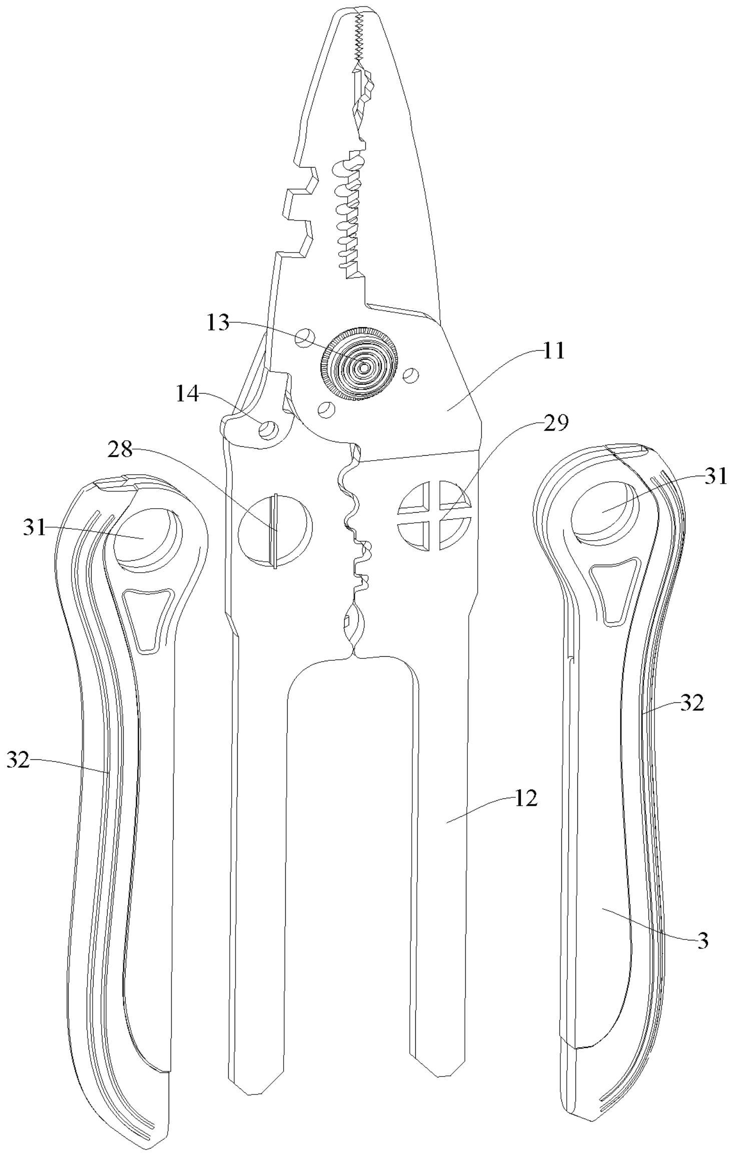
FIG. 4 is an exploded view of electrician pliers with extended plier sleeves.

As shown in FIGS. 1 to 4, the present utility patent provides electrician pliers with extended plier sleeves, which comprise:

- two plier bodies 1 connected by rotation, wherein each of the plier bodies 1 comprises a jaw 11 and a plier handle 12, a jaw of one of the plier bodies is provided with a wire winding part 28, a jaw of the other plier body is provided with a wire splitting part 29, and the wire winding part 28 and the wire splitting part 29 are arranged at the same height; and
- two plier sleeves 3 sleeved with the two plier handles 12 respectively, wherein the two plier sleeves 3 extend correspondingly to the wire winding part 28 and the wire splitting part 29 and coat on a periphery of the wire winding part 28 and a periphery of the wire splitting part 29.

Compared with the prior art, the electrician pliers with the extended plier sleeves provided by the present utility patent have the advantages that the plier sleeves 3 extend to the wire winding part 28 and the wire splitting part 29 and coat the periphery of the through hole, and the welding lines at the wire winding part 28 and the wire splitting part 29 are shielded, so that the aesthetics of the electrician pliers is effectively improved, and there is no need to spend more time processing marks after polishing.

In an embodiment, the plier sleeve 3 is provided with a via hole 31, and the via hole 31 is adapted to and aligned with the through hole in shape and size, so that the normal use of the wire splitting part 29 and the wire winding part 28.

Preferably, a shape of the via hole of the wire winding part 28 and the wire splitting part 29 may be, but not limited to, a circle and a polygon such as a quadrangle, a pentagon and a hexagon, and a shape of the via hole may be, but not limited to, a circle and a polygon such as a quadrangle, a pentagon and a hexagon for selection by a user. The via hole may have a shape different from that of the wire winding part and the wire splitting part.

In an embodiment, the plier sleeve 3 is provided with anti-slip lines 32 to increase the contact friction between hands of the user and the plier sleeves for convenient use.

In an embodiment, a rotating core 13 is arranged between the two jaws; wherein inner sides that are of the two jaws 11 and that are positioned above the rotating core 13 jointly form a wire clamping part 21, a wire-sheath rotating part 22 and a wire stripping part 23, and inner sides that are of the two jaws 11 and that are positioned below the rotating core 13 jointly form a terminal pressing part 25 and a wire-sheath opening part 26, so that the space inside the two plier bodies 1 is fully utilized; and the wire clamping part 21, the wire-sheath rotating part 22, the wire stripping part 23, the terminal pressing part 25 and the wire-sheath opening part 26 are arranged at the inner side, so that the electrician pliers have multiple functions correspondingly, can be used for clamping wires, stripping wires, opening wire sheaths, cutting wire sheaths and pressing terminals, has multiple uses and high applicability.

In an embodiment, an inner side of one of the two jaws 11 is provided with a first notch 221, and an inner side of the other jaw is provided with a cutting edge 222 corresponding to the first notch 221 to form the wire-sheath rotating part 22. The two plier bodies 1 are opened, the wire is inserted into the first notch 221, then the two plier bodies 1 are closed, and finally the electrician pliers are rotated one turn, so that the cutting edge 222 rotates one turn around the wire, and the wire sheath is cut off.

In an embodiment, an inner side of one of the two jaws 11 is provided with a second notch 261, and an inner side of the other jaw is provided with a sharp knife 262 corresponding to the second notch 261 to form the wire-sheath opening part 26. The two plier bodies 1 are opened, the wire head is inserted into the second notch 261, then the two plier bodies 1 are closed, and finally the wire head is dragged to move, so that the sharp knife 262 cuts the wire sheath to expose each signal wire in the wire.

In an embodiment, the terminal pressing part 25 comprises a cold-pressed terminal pressing part 251 and a tubular terminal pressing part 252, so that the application range of the electrician pliers is increased.

In an embodiment, an outer side of one jaw 11 of the two jaws 11 is provided with a groove part 27 for screwing hexagonal nuts and hexagonal head screws, and the space outside the plier bodies 1 is fully utilized, so that the electrician pliers have the function of screwing nuts and screws, the functions of the electrician pliers are further increased, and the application range of the electrician pliers is increased.

In other embodiments, an outer side of one of the jaws 11 is provided with an arc edge part (not shown) for cutting the wires, and the space outside the plier bodies 1 is fully utilized, so that the electrician pliers have the function of cutting wires, the functions of the electrician pliers are further increased, and the application range of the electrician pliers is increased.

In other embodiments, an outer side of one of the jaws 11 is provided with a groove part 27 for screwing hexagonal nuts and hexagonal head screws, and an outer side of the other jaw 11 is provided with an arc edge part for cutting the wire, so that the electrician pliers have the functions of screwing nuts and screws as well as cutting wires at the same time, the functions of the electrician pliers are further increased, and the application range of the electrician pliers is increased.

Further, a plurality of the groove parts 27 are provided, and these groove parts 27 have different sizes and specifications, so as to adapt to nuts with different sizes and specifications, and increase the application range of the electrician pliers.

In an embodiment, the jaw 11 is provided with a steel wire cutting part 24, so that the electrician pliers have the function of cutting steel wires, the functions of the electrician pliers are further increased, and the application range of the electrician pliers is increased. The steel wire cutting part 24 comprises a wire passing hole. When in use, the two plier bodies are opened, the steel wire is passed through the wire passing hole, and then the two plier bodies are rotated to be close to each other, so that the steel wire is cut off.

In an embodiment, the electrician pliers are further provided with a safety lock catch 14, and the safety lock catch 14 is rotatably connected to one of the plier bodies 1 and is used to limit the rotation of the other plier body 1. After the two plier bodies 1 are closed, the safety lock catch 14 rotates towards the plier bodies 1, the safety lock catch 14 is buckled, and the safety lock catch 14 limits one of the plier bodies 1, so that the two plier bodies 1 cannot be separated; when the two plier bodies 1 need to be opened, the safety lock catch 14 rotates outwards, the safety lock catch 14 is released, and the two plier bodies 1 are smoothly opened.

The present utility patent is not limited to the above embodiments. If various modifications or variations of the present utility patent are made without departing from the spirit and scope of the present utility patent, the present utility patent is intended to cover these modifications and variations provided that they fall within the scope of the claims of the present utility patent and equivalent technologies thereof.

The invention claimed is:

1. Electrician pliers with extended plier sleeves, comprising:

two plier bodies connected by rotation, wherein each of the plier bodies comprises a jaw and a plier handle, the two jaws are provided with through holes with the same height, and a wire winding knife is arranged in one of the through holes to form a wire winding part; a wire splitting knife is arranged on a jaw of the other plier body to form a wire splitting part; and two plier sleeves are respectively sleeved with the two plier handles, and the two plier sleeves extend correspondingly to the wire winding part and the wire splitting part and coat a periphery of the through hole, wherein each plier sleeve is provided with a via hole, and the via hole is adapted to and aligned with the through hole in shape and size;

wherein a rotating core is arranged between the two plier bodies; inner sides of the two jaws positioned above the rotating core jointly form a wire clamping part, a wire-sheath rotating part and a wire stripping part; and inner sides of the two jaws positioned below the rotating core jointly form a terminal pressing part and a wire-sheath opening part;

wherein an inner side of one of the two jaws is provided with a first notch, and an inner side of the other jaw is provided with a cutting edge corresponding to the first notch to form the wire-sheath rotating part; and wherein an inner side of one of the two jaws is provided with a second notch, and an inner side of the other jaw is provided with a sharp knife corresponding to the second notch to form the wire-sheath opening part.

2. The electrician pliers with the extended plier sleeves according to claim 1, wherein the through hole is in a shape of a circle and a polygon.

3. The electrician pliers with the extended plier sleeves according to claim 1, wherein the via hole is in a shape of a circle and a polygon.

4. The electrician pliers with the extended plier sleeves according to claim 1, wherein the plier sleeve is provided with anti-slip lines.

5. The electrician pliers with the extended plier sleeves according to claim 1, wherein the terminal pressing part comprises a cold-pressed terminal pressing part and a tubular terminal pressing part.

6. The electrician pliers with the extended plier sleeves according to claim 1, wherein an outer side of one of the two jaws is provided with a groove part for screwing hexagonal nuts and hexagonal head screws.

* * * * *